Figure 1:
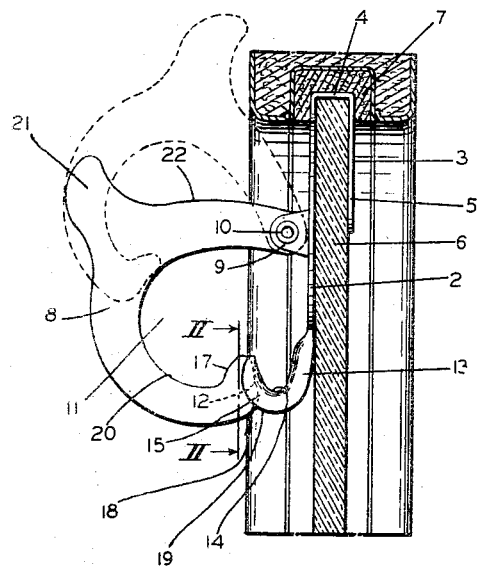

June 19, 1951     M. C. DELLINGER ET AL     2,557,264

AUTOMOBILE MOUNTED CLOTHES HANGER SUPPORT

Filed June 4, 1949

Inventors
MARTIN C. DELLINGER
PAUL C. DELLINGER by
Harold N. Borthwick
Attorney

Patented June 19, 1951

2,557,264

UNITED STATES PATENT OFFICE 2,557,264

AUTOMOBILE MOUNTED CLOTHES HANGER SUPPORT

Martin C. Dellinger and Paul C. Dellinger, Manheim Township, Lancaster County, Pa.

Application June 4, 1949, Serial No. 97,252

4 Claims. (Cl. 224—42.45)

1

This invention relates to hangers and, more particularly, to a hanger of the type which can be mounted over the edge of a window in an automobile or other vehicle to provide a support upon which relatively heavy objects such as brief cases and the like may be hung, as well as clothing, umbrellas, and other articles of a lighter nature.

There are many types of hangers on the market for use in automobiles, some of which include vacuum cups for attaching a hanger or support to the side window glass of the automobile. This type of hanger is desirable in that it permits the window to be tightly closed, and raised or lowered; but, like most of the hangers provided for automobile use, it will not support heavy articles and makes no provision for safely securing the article or its support, such as a coat hanger, against accidental dislodgment when the vehicle stops suddenly or swerves in turning a corner or the like.

An object of this invention is to provide a readily demountable hanger which may be disposed over the upper edge of the side window glass or the like of an automobile or other vehicle and which will permit the vehicle window to be closed, with the upper edge of the window received within its sealing channel in the window frame, the hanger being firmly and rigidly supported by the window.

Another object of the invention is to provide a hanger, including a clasp and keeper arrangement which will support articles in such manner as to prevent accidental dislodgment.

Another object of the invention is to provide a hanger with a pivoted clasp, including a depending hook for the reception of an article to be carried by the hanger, with the hook being disposed outwardly of the pivot for the clasp whereby the weight of the article supported by the hook will tend to rotate the clasp into a closed position and hold it there.

A further object of the invention is to provide a hanger, including a closed hook type clasp which will receive and support articles of considerable size and weight, the hook being movable about a pivot to effect opening of the hook, and ready removal of the article supported by the hook.

An additional object of the invention is to provide a hanger, including a plurality of hooks for the reception of a plurality of articles disposed in spaced relationship, with the hooks being substantially enclosed to prevent dislodgment of the articles supported by the hooks.

Another object of the invention is to provide a

2 hanger with a pivoted hook type clasp which may be automatically opened by pressure applied to the hook and which will automatically close upon the release of pressure.

Figure 2:
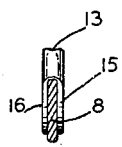

Other objects of the invention will become apparent upon consideration of the following description of a preferred embodiment of the invention which is illustrated in the attached drawing and in which:

Figure 1 is a view partially in side elevation and partially in section, showing a hanger of the present invention mounted upon a side window of a vehicle; and Figure 2 is a sectional view taken along the line II—II of Figure 1.

Referring to Figure 1, the hanger includes a base plate 2 which is provided with a hook 3 of U-shape and including a flange 4 and a depending clamping portion 5 adapted to be disposed over a glass window 6, for example, of an automobile. The base 2 and the hook 3 are preferably integrally formed and the width of the flange 4 is predetermined so that the base 2 and the clamping portion 5 of the hook 3 lie in firm engagement with the glass 4. This permits the hook portion of the hanger to be received within the gasketing channel 7 of the window frame of the vehicle.

A hook-shaped clasp 8 is pivoted to the base plate 2, being received between tongues 9 preferably struck from the metal of the base plate 2 and projecting at right angles to the base plate. Only one tongue is shown in Figure 1, the tongue not shown lying directly in back of the tongue which is shown and being of the same construction. The two tongues 9 are spaced apart a distance to receive the clasp 8 therebetween. A rivet 10 is provided as a pivot about which the clasp 8 may rotate from the normally closed position shown in solid lines to the open position shown in dotted lines.

The clasp 8 is of hook shape, as indicated in Figure 1, and there is provided a curved opening 11 between the clasp 8 and the base plate 2 for the reception of the handle of a brief case, the handle of an umbrella, the hook end of a coat hanger, or other article to be supported. Preferably the terminal end 12 of the clasp 8 is received within a keeper 13 which may be formed integrally with the base plate 2. It is preferably of hook shape with an opening 14 for the reception of a coat hanger or the like. The keeper 13 is folded or bent, as indicated in Figure 2, so as to provide abutments 15 and 16 spaced from one another a distance sufficient to receive the terminal edge 12 of the clasp 8 and hold the clasp against lateral displacement. The keeper 13 also serves to hold the clasp 8 with its terminal end 12 spaced outwardly from the pivot 10. Thus, the weight of any article carried by the clasp tends to move the clasp to closed position and hold it with the end 12 lying within the keeper 13, as shown in solid lines in Figure 1. A limiting stop member 17 is preferably formed on the clasp 8 to insure that the weight of any article hung on the clasp will be disposed forward of the pivot and also to prevent the article or its support from sliding on the clasp and falling between the clasp and keeper which might cause the clasp to be opened.

The lower surface of the clasp 8 is curved as indicated at 18, with the curved portion extending generally upwardly toward the pivot 10. This provides a surface against which a coat hanger, for example, may be pressed or thrust; and this will impart a generally outward and upward component of force to the hook-shaped clasp, causing it to automatically open by pivoting about the point 10. The surface 19 of the keeper 13 is also curved to facilitate the entry of the hook end of the coat hanger or the like into engagement with the surface 18 of the clasp by an upward thrust in the general vicinity of the lower edge of the clasp and keeper. When the hook end of the hanger has moved into the opening 12 and leaves the clasp 8 and keeper 13, the clasp automatically closes. Its own weight causes it to move to closed position, rotating about the pivot 10. The weight of the coat hanger and any garment it may carry will hold the clasp in closed position when the coat hanger comes to rest on the inner surface 20 of the clasp. The stop 17 will prevent the coat hanger from overriding the hook, and the keeper 13 will hold the clasp against lateral displacement. Thus the coat hanger or any other article so positioned on the hanger will be securely held against accidental dislodgment.

A projection 21 is preferably provided on the clasp 8 for digital engagement to effect opening of the clasp when it is desired to remove any article received with the opening 11. This may also serve as an auxiliary hook for the reception of a hat or other article to be carried and may serve as a limiting stop to position a brief case or the like, the handle of which may be hung over the clasp 8 in engagement with the upper surface 22 thereof.

While a preferred embodiment of the invention has been illustrated and described, it will be understood that the same is not limited thereto but may be otherwise embodied and practiced within the scope of the following claims.

We claim:

1. A hanger comprising a base member, a hook-shaped clasp pivoted to the base member for movement from a position where the clasp is in closed position to an open position, a keeper on said base member having provided thereon a pair of laterally projecting guide members which define a groove therebetween which receives a portion of said clasp to limit lateral movement of said clasp when in closed position, and an article supporting hook on said clasp, said hook being disposed forwardly of said pivot in all positions of said clasp, whereby any weight applied to the article supporting hook will cause said clasp to be urged about its pivot into closed position.

2. A hanger comprising a sheet metal base member, a generally C-shaped clasp pivoted to the base member closely adjacent to the surface thereof, a limiting stop projecting upwardly at the terminal edge of said clasp, a digital portion projecting from said clasp adjacent the top thereof for manual opening of said clasp, a lipped keeper formed as a rounded hook projecting outwardly from the base member and having provided thereon a pair of laterally projecting guide members which define a groove therebetween which receives the terminal end of said clasp when the clasp is in closed position and prevents lateral displacement of said clasp, said limiting stop lying beyond said pivot and causing the weight of an article received by said clasp and lying adjacent said stop to urge said clasp into closed position within said keeper, and inclined exposed lower surfaces on said clasp and keeper where they join when in closed position providing for the creation of an outward thrust component upon said clasp to move it to open position automatically when an article to be disposed within the clasp is pressed upwardly against said inclined surfaces, said clasp automatically closing about said article after it passes into the clasp beyond the terminal end thereof.

3. A hanger comprising a base member, a keeper on the base member, a hook-shaped clasp pivoted to the base member and projecting outwardly therefrom with the terminal end of the clasp depending below the pivot and lying in engagement with the keeper when in closed position, an upwardly projecting limiting stop on the terminal edge of said clasp to hold any article on said clasp away from the terminal end of said clasp, an inclined surface on one of said clasp and keeper and effective upon engagement by an article inserted between said clasp and keeper and the application of an upward thrust thereto to effect an outward component of force to said clasp to cause the same to pivot away from said keeper, automatically opening said clasp for the reception of said article.

4. A hanger comprising a base member, a keeper on the base member, a hook-shaped clasp pivoted to the base member for movement from a position where the clasp is in closed position in engagement with said keeper to an open position, an article supporting hook provided on the upper portion of said clasp, said hook being disposed forwardly of said pivot, and an upwardly projecting limiting stop on the lower terminal edge of said clasp also disposed forwardly of said pivot whereby any weight applied to the article supporting hook will cause said clasp to be urged about its pivot into closed position in engagement with said keeper.

MARTIN C. DELLINGER.
PAUL C. DELLINGER.

REFERENCES CITED

The following references are of record in the file of this patent:

UNITED STATES PATENTS

| Number | Name | Date |
| --- | --- | --- |
| 376,453 | Scott | Jan. 17, 1888 |
| 1,970,962 | Hinckley | Aug. 21, 1934 |
| 2,344,339 | Zwald | Mar. 14, 1944 |
| 2,346,276 | Reittinger | Apr. 11, 1944 |

FOREIGN PATENTS

| Number | Country | Date |
| --- | --- | --- |
| 6,579 | Switzerland | Apr. 27, 1893 |
| 109,240 | Germany | Nov. 2, 1900 |